United States Patent
Hirose (10) Patent No.: US 6,411,577 B1
(45) Date of Patent: Jun. 25, 2002

(54) METHOD AND APPARATUS FOR DISCRIMINATION BETWEEN OPTICAL DISCS OF DIFFERENT TYPES

(75) Inventor: Hirokazu Hirose, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/392,473

(22) Filed: Sep. 9, 1999

(30) Foreign Application Priority Data

Sep. 10, 1998 (JP) ............................................. 10-257076

(51) Int. Cl.$^7$ ................................................ G11B 7/00
(52) U.S. Cl. ................................ 369/53.22; 369/44.26; 369/53.37
(58) Field of Search ........................... 369/53.22, 53.23, 369/44.25, 44.26, 53.37

(56) References Cited

U.S. PATENT DOCUMENTS

| | | | | |
|---|---|---|---|---|
| 5,671,203 A | * | 9/1997 | Ra | 369/44.25 |
| 5,721,718 A | * | 2/1998 | Hwang | 369/44.25 |
| 5,754,507 A | * | 5/1998 | Nishikata | 369/53.23 |
| 5,831,953 A | * | 11/1998 | Numata | 369/53.22 |
| 6,021,102 A | * | 2/2000 | Seto | 369/44.27 |
| 6,278,672 B1 | * | 8/2001 | Kobayashi | 369/53.23 |

\* cited by examiner

Primary Examiner—Nabil Hindi
(74) Attorney, Agent, or Firm—Perman & Green, LLP (57) ABSTRACT

A method and apparatus for optical disc discrimination, which can discriminate immediately and correctly the types of a plurality of optical discs having different record densities of recorded information from each other. An optical disc discrimination method for discriminating between at least two types of optical discs having record densities of recorded information different from each other; an optical disc to be discriminated is driven to rotate, a read-out light beam is irradiated on the optical disc to be discriminated by performing at least a focus servo operation as a servo operation, an RF signal is obtained by receiving a reflected light beam from the optical disc to be discriminated, the RF signal is converted into binary digits as a pulse train signal, the number of pulses in the pulse train signal is counted for a predetermined time, a count value during the predetermined time is compared with a threshold value, and the optical disc to be discriminated is determined to be one having the least amount of recording density of the at least two types of optical discs when the count value within the predetermined time is equal to or less than the threshold value.

8 Claims, 8 Drawing Sheets

METHOD AND APPARATUS FOR DISCRIMINATION BETWEEN OPTICAL DISCS OF DIFFERENT TYPES

BACKGROUND OF THE INVENTION

1. Field of the Invention

The present invention relates to a method and an apparatus for discrimination between optical discs of different types, which discriminates between optical discs of a plurality of types having different record densities of recorded information.

2. Description of Related Art

Making the recording density of an optical disc higher relates to shortening the wavelength of the read-out light irradiated on the optical disc for reading recorded information. That is, the wavelength of the read-out light for an optical disc having a higher recording density is shorter than the wavelength of the read-out light for an optical disc having a lower recording density. This means that an optical disc has a wavelength of read-out light suitable for its recording density. Therefore, it is sometimes impossible to read recorded information using read-out light of a shorter wavelength from an optical disc having a recording density corresponding to read-out light of a relatively longer wavelength. For example, in the case of a CD-R, it has a reflectivity of nearly 80% for read-out light of a wavelength of about 780 nm, but has a reflectivity of nearly 10% for read-out light of a wavelength equal to or less than 750 nm. Thus, a wavelength of about 780 nm is desirable in order to obtain read-out signals (RF signals) having good spatial-frequency characteristics. On the other hand, in the case of DVD having a high recording density, read-out signals having sufficient spatial-frequency characteristics cannot be obtained and the recorded information cannot be reproduced without using read-out light of a wavelength of about 650nm.

Incidentally, it is more advantageous for the user, compared with using individual players, from the point of view of installation space and price, that a plurality of optical discs having suitable read-out light of different wavelengths such as CD-R and DVD can be reproduced with the same optical disc player.

However, a general-purpose optical disc player for reproducing optical discs of a plurality of types needs to comprise a plurality of light sources for emitting read-out light of wavelengths different from each other and needs to select a light source rapidly, from the plurality of light sources, corresponding to the type of the optical disc that has been set, so that the type of optical disc that has been set needs to be discriminated immediately and correctly.

OBJECT AND SUMMARY OF THE INVENTION

An object of the present invention is to provide a method and an apparatus for discrimination between optical discs of different types, which can discriminate immediately and correctly the types of a plurality of optical discs having different record densities of recorded information from each other.

The optical disc discrimination method according to the present invention is an optical disc discrimination method for discriminating between at least two types of optical discs having recording densities of recorded information, different from each other; characterized in that an optical disc to be discriminated is driven to rotate, a read-out light beam is irradiated on the optical disc to be discriminated by performing at least a focus servo operation as a servo operation, an RF (Radio Frequency) signal is obtained by receiving a reflected light beam from the optical disc to be discriminated, the RF signal is converted into binary digits as a pulse train signal, the number of pulses in the pulse train signal is counted for a predetermined time, a count value during the predetermined time is compared with a threshold value, and the optical disc to be discriminated is determined to be one of the at least two types of optical discs, having the least amount of recording density, when the count value within the predetermined time is equal to or less than the threshold value.

Furthermore, the optical disc discrimination apparatus according to the present invention is an optical disc discrimination apparatus for discriminating between at least two types of optical discs having record densities of recorded information, different from each other; characterized by having a means for driving the optical disc to be discriminated to rotate, a read-out means for performing at least focus servo operation as a servo operation to irradiate a read-out light beam on the optical disc to be discriminated and for receiving a reflected light beam from the optical disc to be discriminated to obtain an RF signal, a converting means for converting the RF signal into binary digits as a pulse train signal, a counting means for counting the number of pulses in the pulse train signal for a predetermined time, a comparing means for comparing a count value during the predetermined time with a threshold value, and a determination means for determining the optical disc to be discriminated to be one of at least two types of optical discs, having the least amount of recording density, when the count value within the predetermined time is equal to or less than the threshold value.

DETAILED DESCRIPTION OF THE PREFERRED EMBODIMENTS

The embodiments of the present invention will be explained in detail below with reference to the drawings.

Figure 1:
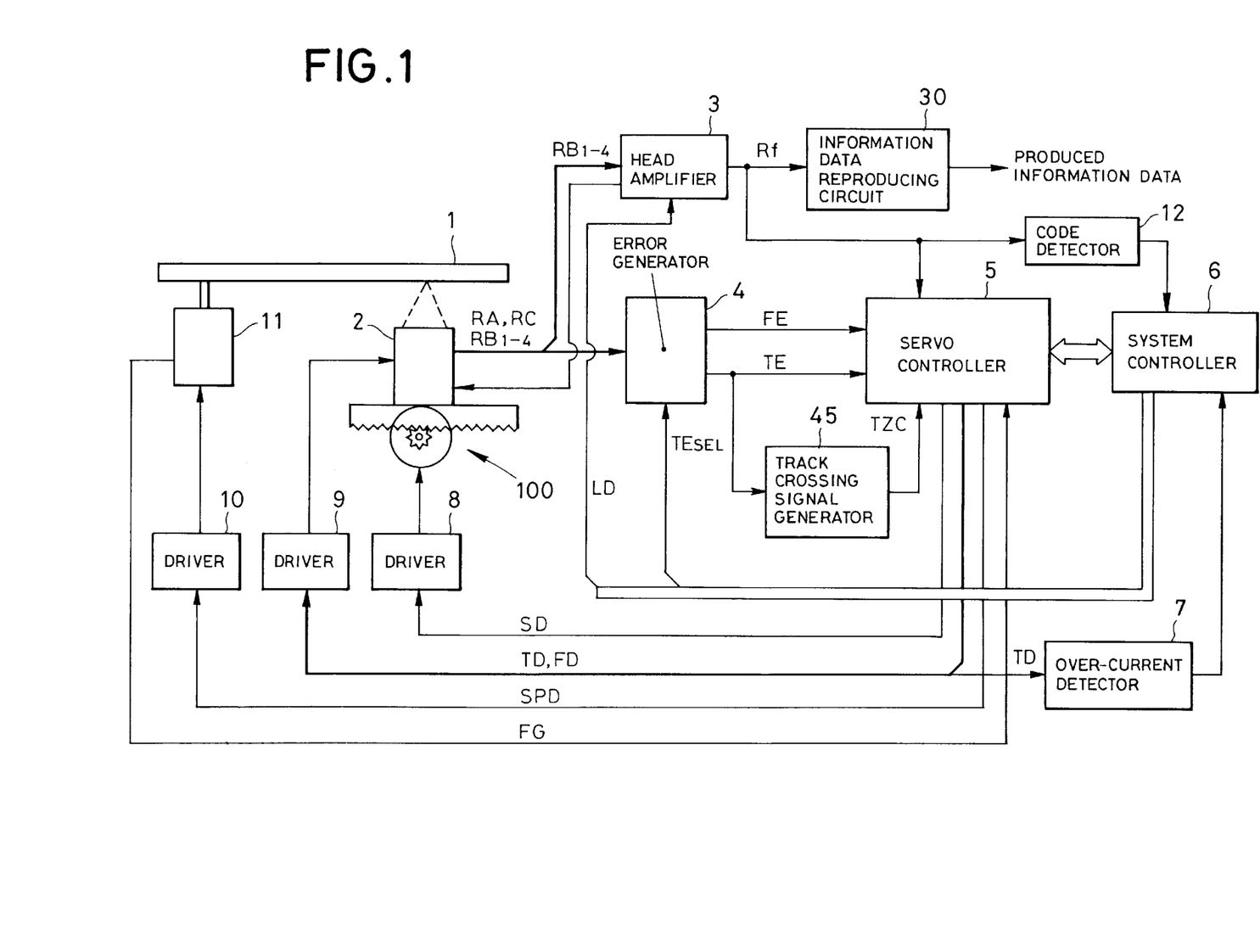
FIG. 1 is a block diagram showing a disc player to which a method for discriminating between optical discs, according to the present invention, is applied.

FIG. 1 is a diagrammatic view showing the outline of an optical disc player to which a method for discriminating between optical discs, according to the present invention, is applied.

In the optical disc player shown in FIG. 1, the types of optical discs 1 which are reproducible are CD, CD-R, and DVD. Rows of pits carrying information data (audio data, video data, and computer data) are formed along spiral or concentric record tracks on the record surface of the optical disc 1. Information data recorded on the optical disc 1, as rows of pits, is optically read out by means of a pick-up 2.

Figure 2:
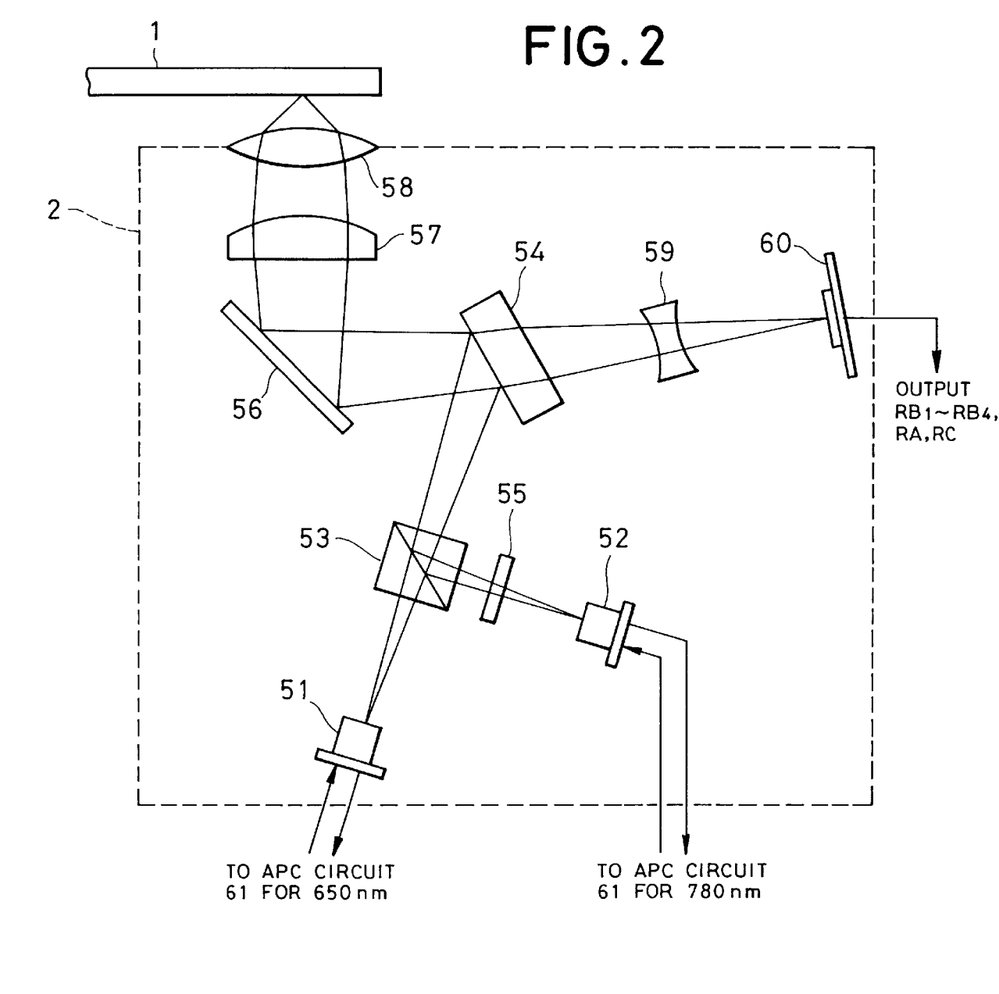
FIG. 2 is a schematic diagram illustrating the configuration of an optical system of the pick-up of the player of FIG. 1.

As shown in FIG. 2, the pick-up 2 has two light sources of laser diodes 51 and 52. The laser diode 51 emits a laser beam of a wavelength of 650 nm (read-out light beam), while the laser diode 52 emits a laser beam of a wavelength of 780 nm. The output beam of light of the laser diode 51 passes through a synthetic prism 53 to reach a half mirror 54. On the other hand, the output beam of light of the laser diode 52 travels through a grating 55 in order to provide 3 beams of light and is then reflected at the synthetic prism 53 to reach the half mirror 54. The beam of light, from either the laser diode 51 or 52, reflected at the half mirror 54 is reflected at a reflective mirror 56, and is then radiated, as a laser spot, onto the record surface of the optical disc 1 via a collimator lens 57 and an objective lens 58. The reflected light produced by reflecting the beam of light radiated onto the optical disc 1 travels through the objective lens 58 and the collimator lens 57, reflected by the reflective mirror 56, and passes through the half mirror 54. The reflected light that has passed through the half mirror 54 reaches a light-receiving unit 60 via a multi-lens 59.

Figure 3:
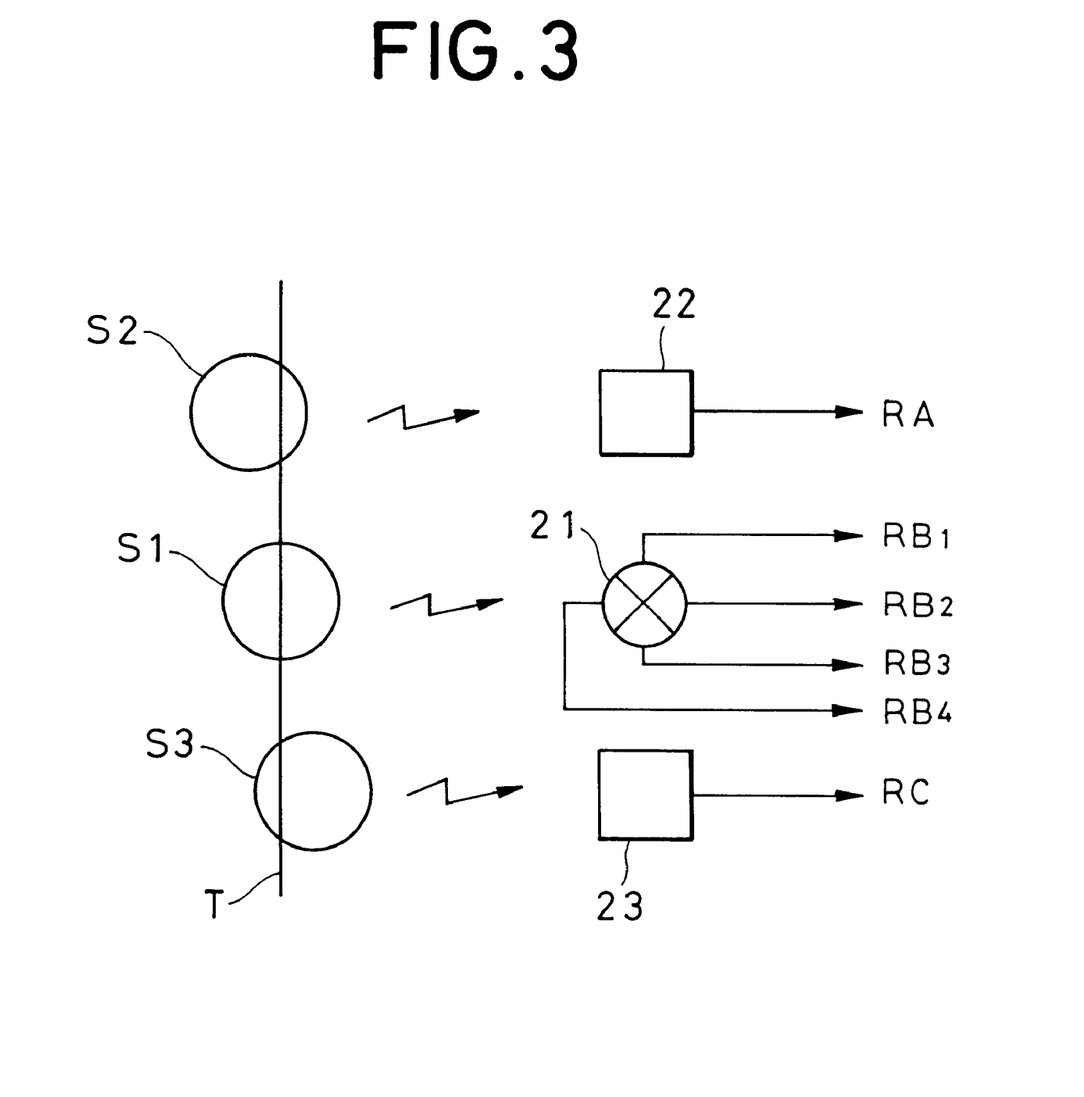
FIG. 3 is a view showing the relationship between spotlights and photodetectors.

As shown in the left part of FIG. 3, the three beams of light are radiated on the record surface of the optical disc 1 to form beam spots S1 through S3 on a record track T. The spot center of the beam spot S1 is designed to be formed on a record track, while the centers of the beam spots S2 and S3 are designed to be formed at positions deviated from the record track toward inner and outer circumferences of the disc, respectively.

As shown in the right part of FIG. 3, the light-receiving unit 60 of the pick-up 2 is provided with photo-detectors 21 through 23 for receiving the reflected light of the radiated beam of light and converting it into electric signals.

As shown in the right part of FIG. 3, the photo-detector 21 comprises four independent light-receiving elements. As shown in the left part of FIG. 3, these four independent light-receiving elements receive the reflected light from the beam spot S1 and output the electric signals into which the reflected light has been converted, as read-out signals RB1 through RB4 respectively. As shown in FIG. 3, the photo-detector 22 receives the reflected light from the beam spot S2 and outputs, as read-out signals RA, the electric signals into which the reflected light has been converted. The photo-detector 23 receives the reflected light from the beam spot S3 and outputs, as read-out signals RC, the electric signals into which the reflected light has been converted.

The aforementioned laser diodes 51 and 52 are controlled to determine whether or not they should radiate beams in accordance with the beam ON/OFF command LD supplied from the system controller circuit 6 via APC circuits 61 and 62, to be described later.

Furthermore, the pick-up 2 is provided with a tracking actuator (not shown) for displacing the positions of the aforementioned beam spots toward the radial direction of the disc, and a focusing actuator (not shown) for adjusting the focus positions of the aforementioned beam spots.

With the configuration mentioned above, the pick-up 2 reads out recorded information from the optical disc 1 to supply the aforementioned read-out signals RA, RB1 through RB4, and RC to a head amplifier 3 and an error generator circuit 4.

The head amplifier 3 determines the total sum of the read-out signals, RB1 through RB4, which are supplied by the aforementioned pick-up 2 to provide RF signals. The RF signal is amplified to a desired value to provide RF signal Rf which is then supplied to the servo controller circuit 5 and an information data reproducing circuit 30.

Figure 4:
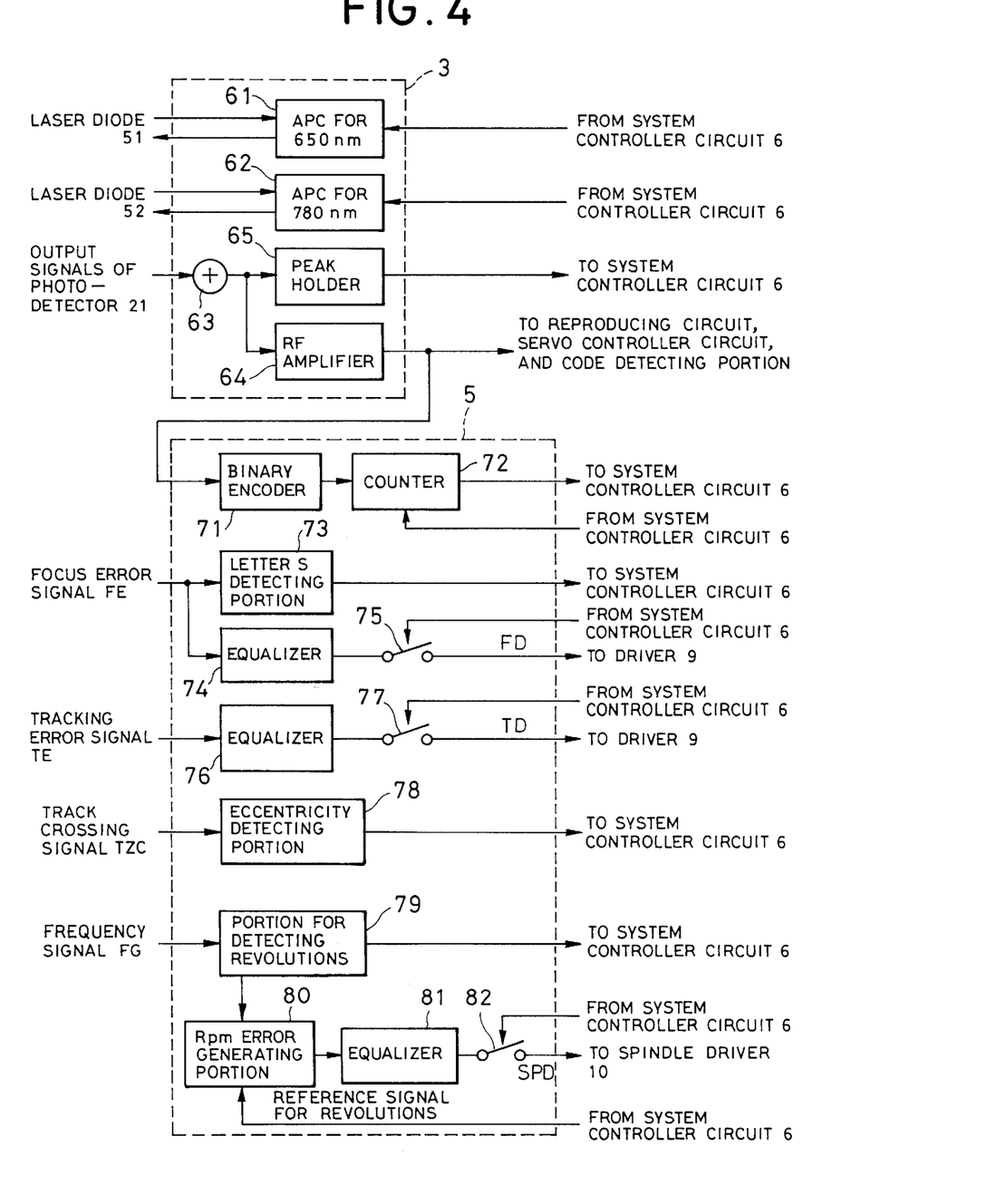
FIG. 4 is a block diagram showing the configuration of head amplifiers and servo controller circuits of the player of FIG. 1.

As shown specifically in FIG. 4, the head amplifier 3 comprises an APC circuit (Automatic Power Control) for a wavelength of 650 nm 61, an APC circuit for a wavelength of 780 nm 62, an adder 63, an RF amplifier 64, and a peak holding circuit 65. The APC circuit 61 controls power by exercising feedback control of the drive current of the laser diode 51 in accordance with the output of a photo-detector (not shown) provided within the laser diode 51 so that the intensity of the output laser beam of the laser diode 51 takes first predetermined value A. The APC circuit 62 controls power by exercising feedback control of the drive current of the laser diode 52 in accordance with the output of a back-light detector (not shown) provided within the laser diode 52 so that the intensity of the output laser beam of the laser diode 52 takes second predetermined value B. The APC circuits 61 and 62 perform the aforementioned power control operation in response to the beam ON command from the system controller circuit 6 and stop the power control operation to stop outputting laser beams in response to the beam OFF command.

The adder 63 adds read-out signals RB1 through RB4 to provide and then supply RF signals to the RF amplifier 64 and the peak holding circuit 65. The RF amplifier 64 amplifies RF signals and the peak holding circuit 65 holds and outputs the peak level of RF signals outputted by the adder 63.

The information data reproducing circuit 30 converts the output RF signal Rf of the RF amplifier 64 into binary values, and then performs demodulation and error correction of the values in order to restore the data recorded on the optical disc 1. Furthermore, the information data reproducing circuit 30 performs information (video, audio, and computer data) decoding processing for the restored data in order to reproduce information data to output the data as reproduced information data.

The error generator circuit 4 generates the focus error signal FE and the tracking error signal TE in accordance with the aforementioned read-out signals RA, RB1 through RB4, and RC, which are supplied by the pick-up 2, respectively, and then supplies the signals to a servo controller circuit 5. Furthermore, the error generator circuit 4 supplies the tracking error signal TE to a track crossing signal generator 45.

Figure 5:
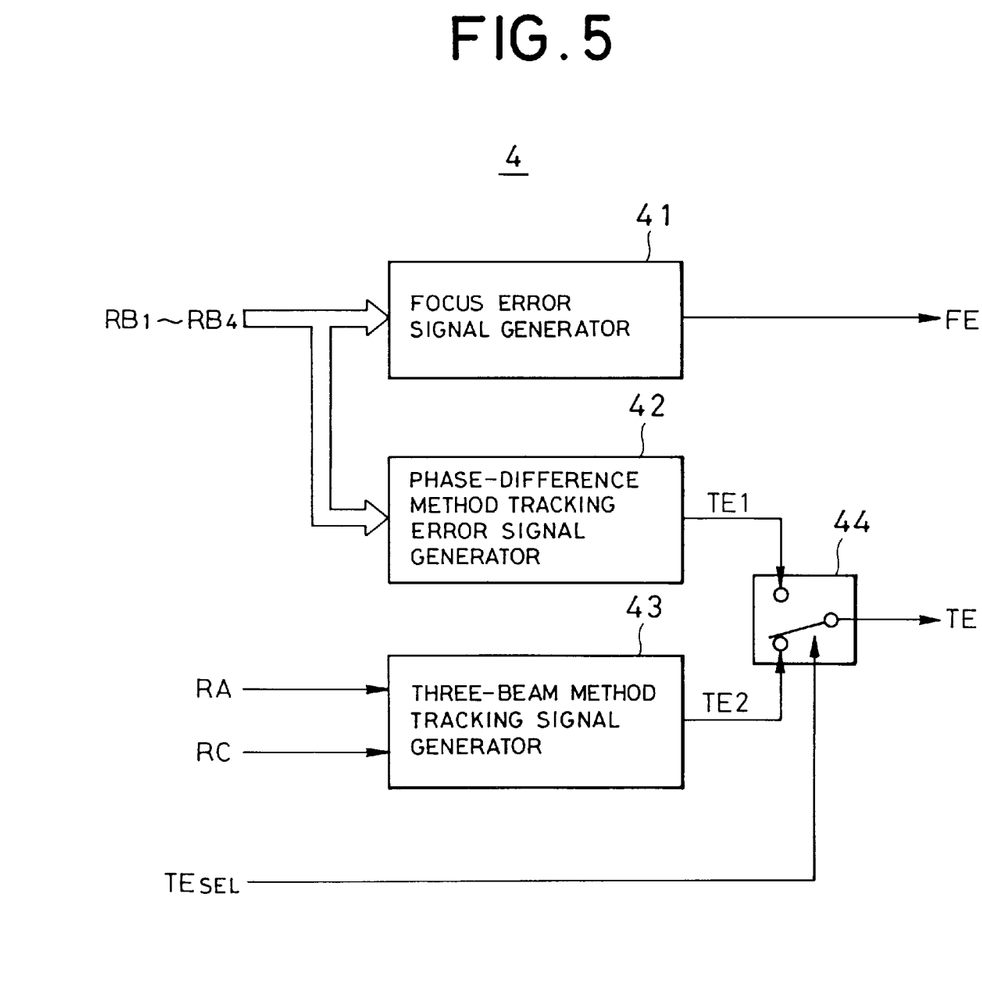
FIG. 5 is a block diagram showing the configuration of an error generator circuit of the player of FIG. 1.

FIG. 5 is a view showing the internal configuration of the error generator circuit 4. Referring to FIG. 5, the focus error signal generating circuit 41 determines, respectively, the sums of the outputs of the light-receiving devices, which sit opposite each other, of the four independent light-receiving elements of the photo-detector 21, and generates a signal of the difference in the sums as the focus error signal FE.

For example, the focus error signal FE is determined by performing the operation below.

$$FE=(RB1+RB3)-(RB2+RB4)$$

The phase difference tracking error signal generating circuit 42 determines, respectively, the sums of the outputs of the light-receiving elements, which sit opposite each other, of the four independent light-receiving elements of the aforementioned photo-detector 21, and determines the phase difference of the sums as the tracking error signal. That is, the phase difference between (RB1+RB3) and (RB2+RB4) is determined as the tracking error signal. The phase difference tracking error signal generating circuit 42 supplies this tracking error signal to a selector 44 as a first tracking error signal TE1.

The three-beam tracking error signal generating circuit 43 determines the difference between the read-out signal RA supplied from the aforementioned photo-detector 22 and the read-out signal RC supplied from the aforementioned photo-detector 23 as the tracking error signal. The three-beam tracking error signal generating circuit 43 supplies this tracking error signal to the selector 44 as a second tracking error signal TE2.

The selector 44 selects alternatively and outputs, as the final tracking error signal TE, one of the aforementioned first tracking error signal TE1 and second tracking error signal TE2, which corresponds to the tracking error selective signal $TE_{SEL}$ supplied from the aforementioned system controller circuit 6. In the system controller circuit 6, the tracking error selective signal $TE_{SEL}$ is generated in a manner such that the selector 44 selects the phase difference tracking error signal generating circuit 42 when the laser diode 51 for a wavelength of 650 nm is activated, and the selector 44 selects the three-beam tracking error signal generating circuit 43 when the laser diode 51 for a wavelength of 780 nm is activated.

The track crossing signal generator circuit 45 generates a binary track crossing signal TZC which takes a logic level of "1" when the signal level of the aforementioned tracking error signal TE obtained during a track jump of the pick-up 2 is greater than a predetermined level and takes a logic level of "0" when the level is less than the predetermined level, in order to supply the track crossing signal TZC to the servo control circuit 5. That is, the track crossing signal generator circuit 45 generates and outputs, as the track crossing signal TZC, a pulse signal which has, for example, a logic level changing from "0" through "1" to "0", at the time of a track jump, each time the pick-up 2 crosses a record track.

As shown in FIG. 4, in the servo control circuit 5, a frequency signal FG of an AC signal showing the current rpm frequency of a spindle motor 11 which rotates the optical disc 1 is supplied to an rpm detector portion 79. The rpm detector portion 79 generates an rpm signal which shows the number of revolutions of the spindle corresponding to the frequency signal FG, and the rpm signal is supplied to the system controller circuit 6 and to an rpm error generating portion 80 as well. The rpm error generating portion 80 generates an rpm error signal which shows the difference between the rpm signal and the reference rpm signal supplied from the system controller circuit 6, and supplies the rpm error signal to an equalizer 81. The rpm error signal causes the equalizer 81 to generate a spindle drive signal SPD, and the spindle drive signal SPD is supplied to the spindle motor 11 via a driver 10 when a switch 82 is turned on. The spindle motor 11 drives the optical disc 1 to allow the same to rotate at the number of revolutions corresponding to the aforementioned spindle drive signal SPD. At this time, an AC generator (not shown) provided on the spindle motor 11 supplies the aforementioned frequency signal FG corresponding to the current rpm frequency to the servo control circuit 5. The spindle servo system thus configured allows the spindle motor 11 to be driven to rotate at the number of revolutions shown by the reference rpm signal supplied from the system controller circuit 6.

Furthermore, in the servo control circuit 5, the aforementioned focus error signal FE is supplied to an equalizer 74, and the equalizer 74 generates the focusing drive signal FD which is in turn supplied to the pick-up 2 via a driver 9 when a switch 75 is turned on. This allows the focusing actuator mounted on the pick-up 2 to adjust the focal position of the aforementioned beam spots S1 through S3 in response to the aforementioned focusing drive signal FD. Moreover, the focus error signal FE is supplied to a letter S detecting portion 73, and the letter S detecting portion 73 supplies output signals thereof to the system controller circuit 6.

Still furthermore, in the servo control circuit 5, the aforementioned tracking error signal TE is supplied to the equalizer 76, and the equalizer 76 generates the tracking drive signal TD which is in turn supplied to the pick-up 2 via the driver 9 when a switch 77 is turned on. This allows the tracking actuator mounted on the pick-up 2 to displace positions of the aforementioned beam spots S1 through S3 toward the radial direction of the disc by an amount corresponding to the drive current from the aforementioned tracking drive signal TD.

The aforementioned switches 75, 77, and 82 are turned on or off, respectively, in response to commands from the system controller circuit 6. The switch 75 is turned on at the time of focus servo control, the switch 77 is turned on at the time of tracking servo control, and the switch 82 is turned on at the time of spindle servo control.

The track crossing signal TZC is supplied to an eccentricity detecting portion 78 comprising counters, and the output count value of the eccentricity detecting portion 78 shows the amount of eccentricity of the optical disc 1 which is supplied to the system controller circuit 6.

Furthermore, the servo control circuit 5 comprises a binary encoder 71 for converting the output RF signal Rf of the RF amplifier 64 into binary digits to output signals in pulse trains and a counter 72 for counting the pulse train signal. Output signals of the counter 72 are supplied to the system controller circuit 6. The count value of the counter 72 is reset to zero for each predetermined time t (for example, 250 msec) in response to the command of the system controller circuit 6.

Furthermore, though not shown in FIG. 4, the servo control circuit 5 generates the slider drive signal SD in accordance with the aforementioned tracking error signal TE which is supplied to a slider 100 via a driver 8. This causes the slider 100 to move the pick-up 2 in the radial direction of the disc at a number of revolutions in response to the drive current of the slider drive signal SD.

An over-current detector circuit 7 detects whether or not the drive current, due to the tracking drive signal TD, has had an over-current exceeding the rated current, and the detection result is supplied to the system controller circuit 6. When an over current is detected, the system controller circuit 6 turns off the switch 77 to stop the tracking servo operation. Since performing a tracking servo operation with an optical disc mistakenly identified may cause the tracking error to grow larger and thus the servo operation to fall into an abnormal condition, this is done in order to prevent such an abnormal condition. Concerning the detection processing of over-current, this is not limited to the tracking servo but the same holds true for other servos such as the focus and slider servos.

The system controller circuit 6 comprises microcomputers for controlling the whole disc player and generates various control signals in response to various operation commands from the user and operating conditions of the current disc player. The servo control circuit 5 performs servo control operation in response to the various control signals generated at the system controller circuit 6.

Figure 6:
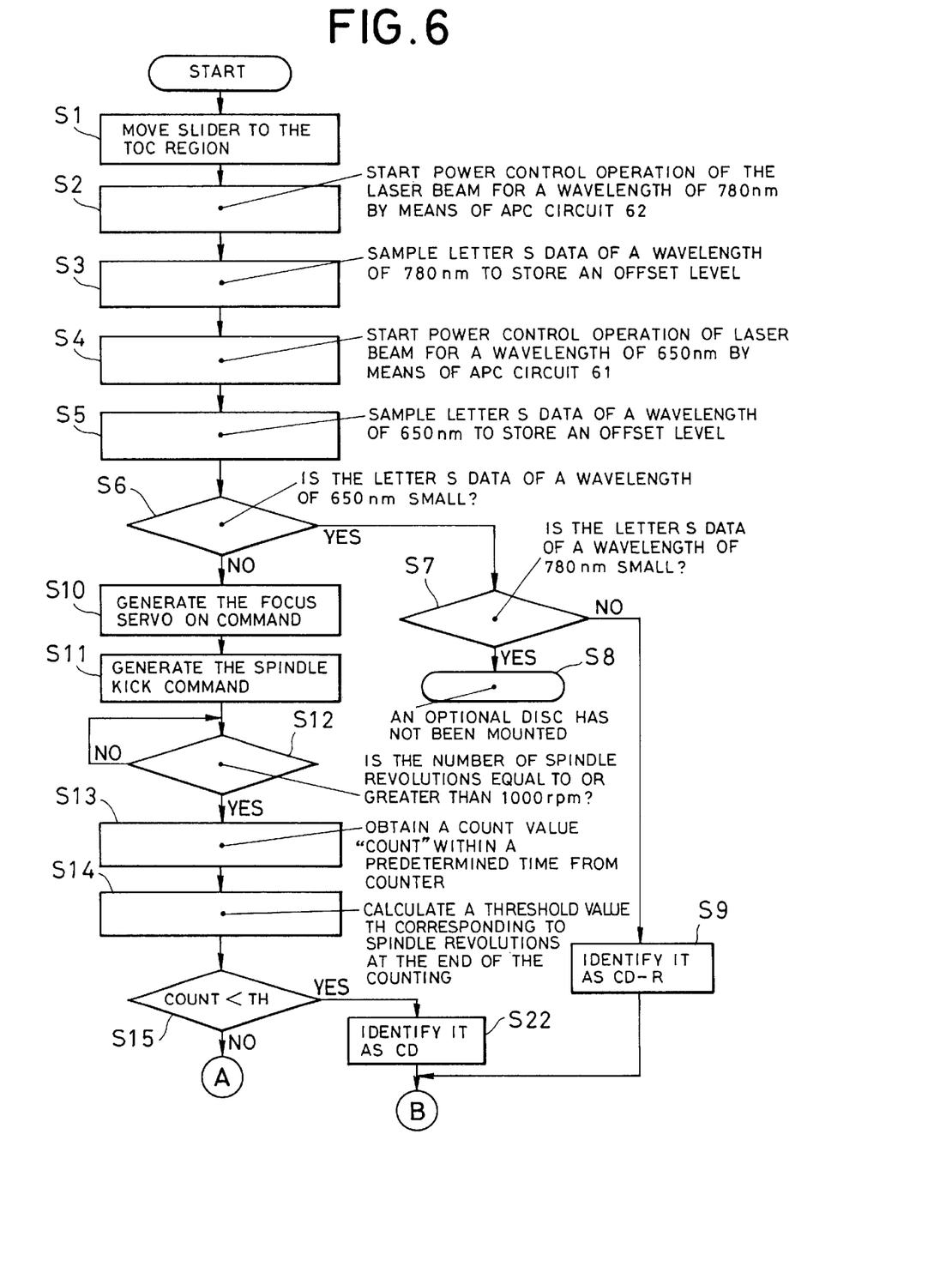
FIG. 6 is a flowchart showing the operation of disc discrimination.
Figure 7:
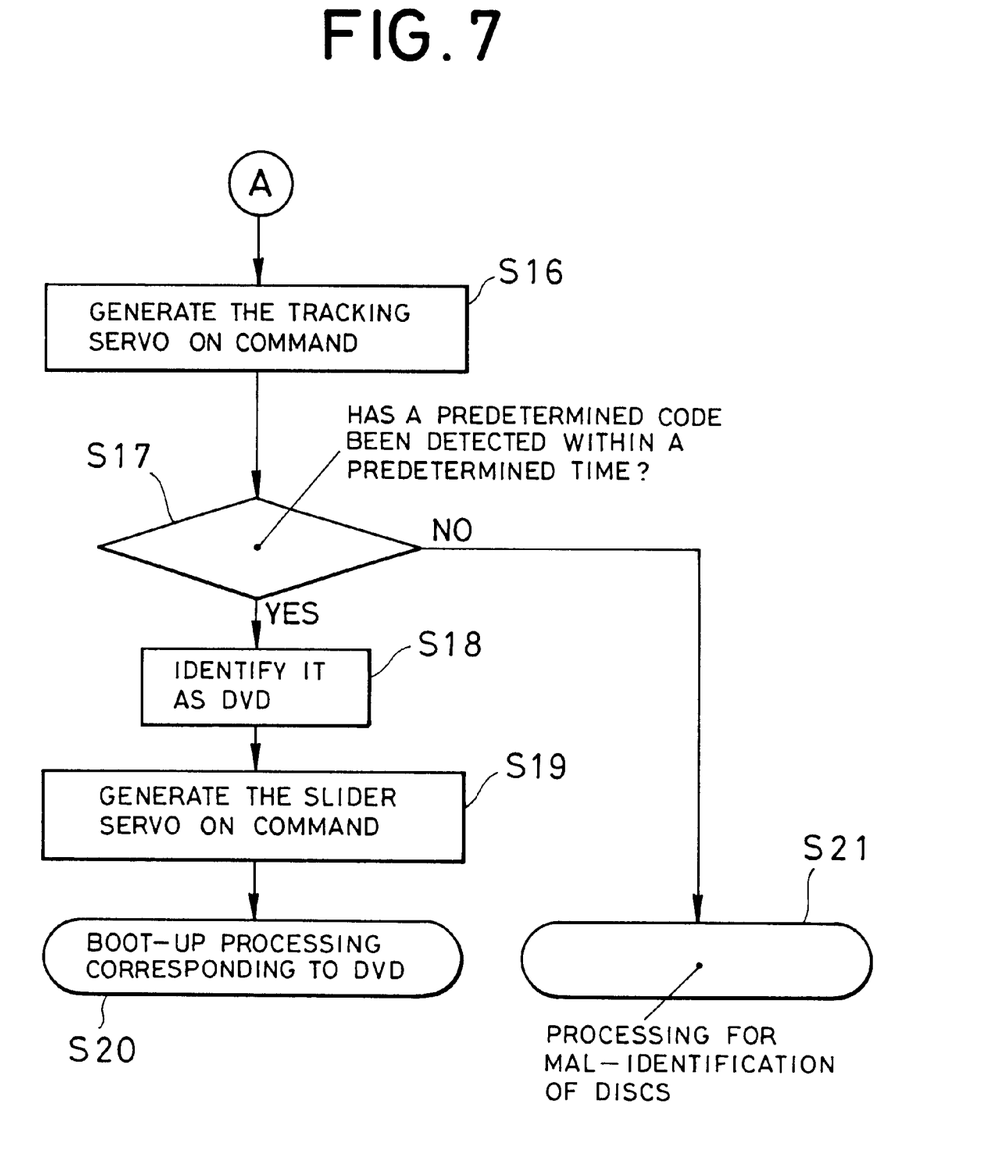
FIG. 7 is a flowchart showing a continued part of the operation of disc discrimination of FIG. 6.
Figure 8:
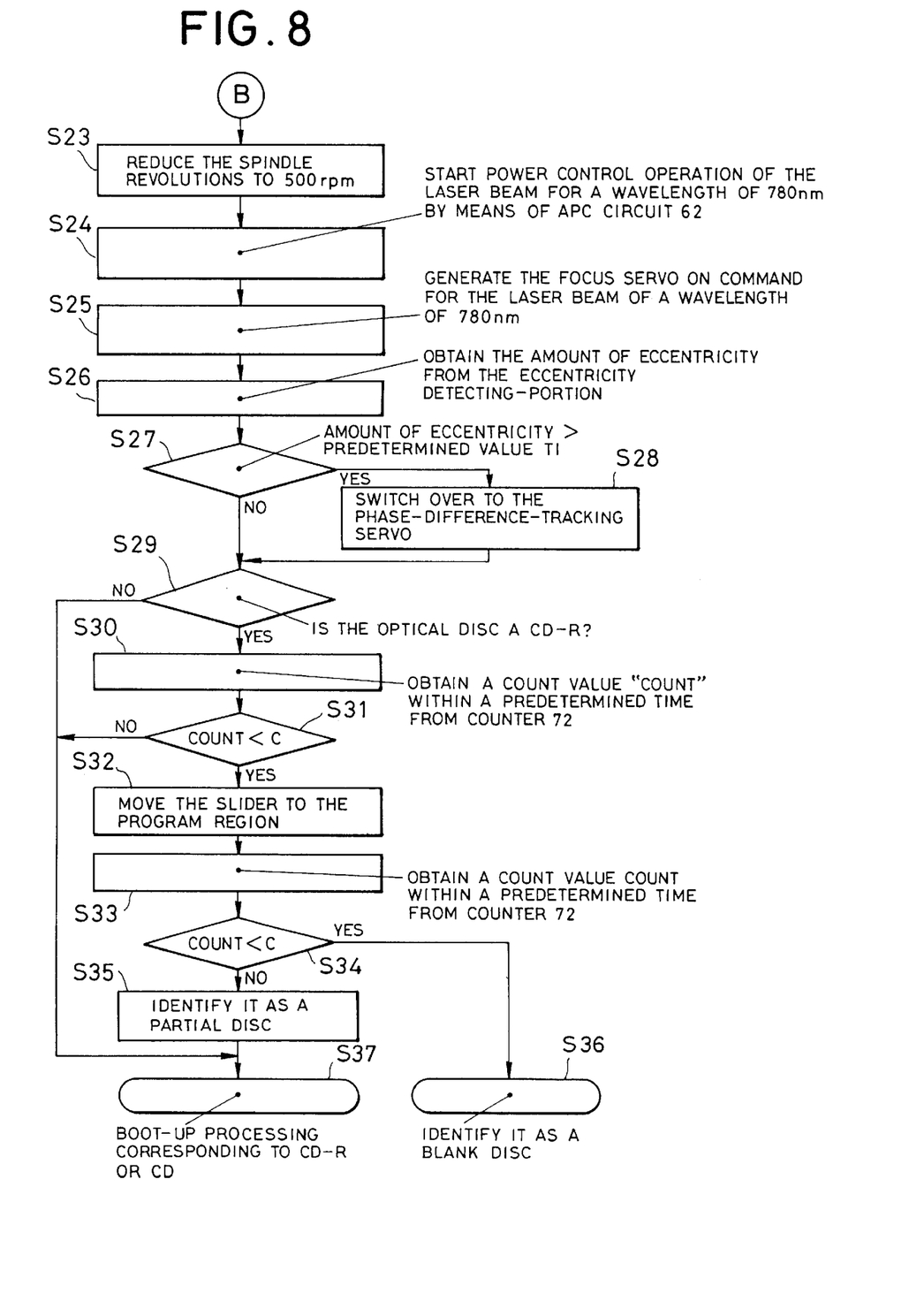
FIG. 8 is a flowchart showing another continued part of the operation of disc discrimination of FIG. 6.

The disc discriminating operation to be processed at the system controller circuit 6 will now be explained with reference to FIG. 6 through FIG. 8.

First, a processor (not shown) of the system controller circuit 6 controls the driver 8 to move the slider 100 so that the beam spot of radiation of the pick-up 2 is positioned at the TOC region of the optical disc 1 (step S1). Then, the processor allows the APC circuit 62 to start power control operation in order to radiate a laser beam of a wavelength of 780 nm to the optical disc 1 (step S2). The processor samples output levels of the letter S detecting portion 73 for a predetermined time to hold the levels as the letter S data of a wavelength of 780 nm, and stores the average value of the level data held as the offset level of a wavelength of 780 nm (step S3). The processor then causes the APC circuit 62 to stop power control operation and the APC circuit 61 to start power control operation in order to radiate a laser beam of a wavelength of 650 nm to the optical disc 1 (step S4). Then, the processor samples output levels of the letter S detecting portion 73 for a predetermined time to hold the levels as the letter S data of a wavelength of 650 nm, and stores the average value of the level data held as the offset level of a wavelength of 650 nm (step S5).

The offset levels are taken at steps S3 and S5 when the optical disc 1 is halted. Since the optical disc 1 and an objective lens 58 may contact each other due to surface vibration of the optical disc 1 in a rotational condition when the objective lens 58 of the pick-up 2 is driven toward the focusing direction, the offset levels are taken in order to prevent such a fault. In this embodiment, before discrimination is started to identify the disc by rotating the same at steps S3 and S5, which is to be described later, the offset levels corresponding to the laser diodes of each wavelength are obtained in advance. Thus, the servo adjustment such as gain setting can be performed in accordance with the offset levels obtained in advance when the laser diode is switched over according to the disc discrimination result. That is, the boot-up operation for reproduction can be made at a high speed because it is not necessary to halt the disc to obtain an offset level generally at the time of switching over laser diodes.

It is discriminated whether or not the size of the letter S data of a wavelength of 650 nm, that is, the p-p (peak to peak) value of the letter S data is less than predetermined value $P_{REF}$ (step S6). If the p-p value of the letter S data for a wavelength of 650 nm is less than predetermined value $P_{REF}$, it is then discriminated whether or not the size of the letter S data of a wavelength of 780 nm, that is, the p-p value of the letter S data is less than predetermined value $P_{REF}$ (step S7). If the p-p value of the letter S data for a wavelength of 780 nm is less than predetermined value $P_{REF}$, it is determined that the optical disc 1 has not been set and thus a disc discrimination variable DISC is set to 0 (step S8). If the p-p value of the letter S data for a wavelength of 780 nm is equal to or greater than predetermined value $P_{REF}$, the optical disc 1 can be regarded as a CD-R and thus the disc discrimination variable DISC is set to 1 (step S9). After step S9 has been executed, the step proceeds to S23.

If the p-p value of the letter S data for a wavelength of 650 nm is equal to or greater than predetermined value $P_{REF}$ at step S6, the focus servo ON command is generated to turn on the switch 75 (step S10). Turning on the switch 75 causes the focus servo operation to start. After step S10 has been executed, the spindle kick command is generated (step S11). The spindle driver 10 starts driving the spindle motor 11 to allow the same to rotate in response to the spindle kick command. Moreover, the switch 82 is turned on, the spindle servo operation is started, and a reference rpm signal showing a specific number of revolutions $N_{REF}$ (the number of revolutions greater than 1000 rpm, for example, 1400 rpm) is supplied to the rpm error generating portion 80 by the system controller circuit 6. Accordingly, the spindle motor 11 is accelerated to the specific number of revolutions $N_{REF}$.

After the spindle kick command has been generated, the processor of the system controller circuit 6 discriminates, by obtaining the number of revolutions of the spindle motor 11 in response to the output signal of the rpm detecting portion 79, whether or not the number of revolutions has reached 1000 rpm or more (step S12). If the number of revolutions of the spindle motor 11 has reached 1000 rpm or more, count value COUNT within a predetermined time t is obtained from the counter 72 (step S13). At this time, the tracking servo operation is not performed, the RF signal Rf for allowing a radiation spot to move by diagonally crossing tracks on the record surface of the optical disc 1 is obtained from the head amplifier 3, the RF signal Rf is converted into a signal of a pulse train by the binary encoder 71, and the number of high level portions in the pulse train signal is counted by the counter 72.

The processor of the system controller circuit 6 obtains the number of revolutions of the spindle $N_{DET}$ from the current output signal of the rpm detector portion 79 when the counting operation of the counter 72 within a predetermined time t has been completed, and then calculates threshold value TH corresponding to the number of revolutions $N_{DET}$ (step S14). Since reference value $TH_{REF}$ of the threshold value corresponding to the aforementioned specific number of revolutions, $N_{REF}$, has been determined in advance, the threshold value TH corresponding to the current number of revolutions, $N_{DET}$, is calculated in accordance with equation, $TH=(N_{DET} \times TH_{REF})/N_{REF}$. After threshold value TH has been calculated, it is discriminated whether or not the count value COUNT is less than threshold value TH (step S15). If COUNT≧TH, it means that the recording density is high, and thus the optical disc 1 can be regarded as a DVD. In this case, the tracking servo ON command is subsequently generated (step S16). Generation of the tracking servo ON command causes the switch 77 to be turned on and the tracking servo operation to be started.

Since the specific number of revolutions, $N_{REF}$, has a value within the number of revolutions of the spindle at the time of reproducing DVD and it takes time for an actual number of revolutions of the spindle to reach this specific number of revolutions, $N_{REF}$, and stabilize, threshold value TH is calculated corresponding to the current number of revolutions, $N_{DET}$, of the spindle at step S14 in order to discriminate the optical disc 1 during acceleration of the number of revolutions of the spindle before reaching the specific number of revolutions, $N_{REF}$. In the above-mentioned calculation of threshold value TH, it is also possible to take, as the aforementioned number of revolutions, $N_{DET}$, an intermediate value between the number of revolutions of the spindle at the time of starting the counting operation of the counter 72 and that at the time of completing the counting operation.

After the tracking servo operation has been performed by executing step S16, it is discriminated at a code detecting portion 12 whether or not a predetermined code has been detected within a predetermined time (step S17). If a predetermined code (for example, an ID code or a sub-code) for identifying a DVD has been detected within a predetermined time at the code detecting portion 12, the optical disc 1 can be identified as a DVD, so that the disc discrimination variable DISC is set to 2 (step S18), and then the slider servo ON command is generated (step S19). The servo control circuit 5 generates the slider drive signal SD in response to the slider servo ON command and supplies the slider drive signal SD to the slider 100 via the driver 8. After step S19 has been executed, the boot-up processing corresponding to DVD is carried out (step S20). If the predetermined code for identifying a DVD has not been detected within a predetermined time at the code detecting portion 12, the disc mal-discrimination processing is performed (step S21).

If COUNT<TH at step S15, this indicates that the recording density is low, and thus the optical disc 1 can be regarded as a CD and then the disc discrimination variable DISC is set to 3 (step S22). The CD includes CD-R, to be mentioned later, for which the final processing has been performed.

After step S9 or S22 has been executed, a reference rpm signal showing 500 rpm for reducing the number of revolutions of the spindle motor 11 to 500 rpm is generated to the rpm error generating portion 80 (step S23). Then, the APC circuit 61 is allowed to stop power control operation and the APC circuit 62 is allowed to start power control operation in order to radiate a laser beam of a wavelength of 780 nm to the optical disc 1 (step S24). Since the operation of the focus servo system is temporarily stopped for switching over wavelengths, a new focus servo ON command is generated for a laser beam of a wavelength of 780 nm to turn on the switch 75 (step S25). At this time, level adjustment regarding the focus servo and the like is carried out in accordance with the offset level held in advance at step S3.

After step S25 has been executed, the processor of the system controller circuit 6 obtains the amount of eccentricity from the output signal of the eccentricity detecting portion 78 (step S26), and it is discriminated whether or not the amount of eccentricity is greater than predetermined value T1 (step S27). If the amount of eccentricity >predetermined value T1, the tracking error selective signal $TE_{SEL}$ is generated so that the selector 44 selects the phase difference tracking error signal generating circuit 42 even when the laser diode 51 of a wavelength of 780 nm is being driven (step S28). After that, the step proceeds to step S29. If the amount of eccentricity≦predetermined value T1, then the step proceeds immediately to step S29.

At step S29, it is discriminated whether or not the optical disc 1 is a CD-R. If the disc discrimination variable DISC=1 after step S9 has been executed, since the optical disc 1 is a CD-R, the count value COUNT within a predetermined time t is obtained from the counter 72 (step S30). At this time, the tracking servo operation is not performed, the RF signal Rf for allowing a radiation spot to move by diagonally crossing tracks on the TOC region of the optical disc 1 of a CD-R is obtained from the head amplifier 3, the RF signal Rf is converted into a signal of a pulse train by the binary encoder 71, and the number of the high level portions in the pulse train signal is counted by the counter 72.

After step S30 has been executed, it is discriminated whether or not the count value COUNT of the counter 72 within a predetermined time t is less than predetermined value C (step S31). If COUNT≧C, since the optical disc 1 has a high recording density of the TOC region, the disc is a CD-R for which data has been written in the program region and in the TOC region, and for which the final processing has been carried out. On the other hand, if COUNT<C, since it is not a CD-R for which the final processing has not been carried out, the slider 100 is forcibly moved to cause the radiation beam spot of the pick-up 2 to position at the program region of the optical disc 1 (step S32). Then, the step S32 is executed, and the count value COUNT is obtained from the counter 72 (step S33). Next, it is determined whether or not the count value COUNT of the counter 72 within a predetermined time t is less than predetermined value C (step S34). If COUNT≧C at step S34, since the optical disc 1 has a high recording density at the program region, the optical disc 1 is a CD-R (partial disc) for which data has been partially written in the program region. In this case, 1 is set to the PRD flag (step S35). If COUNT<C at step S34, since the optical disc 1 has a low recording density a the program region, the disc is a non-recorded CD-R (blank disc) for which data has never been written in the program region. In this case, the aforementioned PRD flag is reset to 0 (step S36).

If the optical disc 1 is a CD based on the discrimination result at step S29, and if the optical disc 1 is a CD-R, based on the discrimination result at step S31, for which the final processing has been carried out, or if the optical disc 1 is a partially recorded CD-R based on the discrimination result at step S34 and PRD flag=1 at step S35, then boot-up processing is performed for CD-R or CD (step S37).

The aforementioned embodiment has been explained for discriminating between optical discs such as CD, CD-R, and DVD, but discrimination is not to be limited only to these kinds of discs.

As mentioned above, according to the present invention, since an optical disc to be discriminated is driven to rotate, read-out light is radiated to the optical disc to be discriminated by performing at least a focus servo operation as a servo operation, RF signal is obtained by receiving reflected light from the optical disc to be discriminated, the RF signal is converted into binary digits as a pulse train signal, the number of pulses in the pulse train signal is counted for a predetermined time, a count value during the predetermined time is compared with a threshold value, and the optical disc to be discriminated is determined to be one having the least amount of recording density of the at least two types of optical discs when the count value within the predetermined time is equal to or less than the threshold value, the types of a plurality of optical discs having different record densities of recorded information with each other can be discriminated immediately and correctly.

What is claimed is:

1. An optical disc discrimination method for discriminating between at least two types of optical discs having record densities of recorded information, different from each other, comprising the steps of:

driving the optical disc to be discriminated to rotate;

performing at least a focus servo operation as a servo operation to irradiate a read-out light beam on said optical disc to be discriminated and receiving a reflected light beam from said optical disc to be discriminated to obtain an RF (Radio Frequency) signal;

converting said RF signal into binary digits as a pulse train signal;

counting the number of pulses in said pulse train signal for a predetermined time when rotation of said optical disc is accelerating;

comparing a count value during said predetermined time with a threshold value; and determining said optical disc to be discriminated to be one of said at least two types of optical discs, having a least amount of recording density, when the count value within said predetermined time is equal to or less than said threshold value.

2. The optical disc discrimination method according to claim 1, wherein an irradiation position of said read-out light beam is at a position of a TOC (Table Of Contents) region of said optical disc to be discriminated.

3. An optical disc discrimination method for discriminating between at least two types of optical discs having record densities of recorded information, different from each other, comprising the steps of:

driving the optical disc to be discriminated to rotate;

performing at least a focus servo operation as a servo operation to irradiate a read-out light beam on said optical disc to be discriminated and receiving a reflected light beam from said optical disc to be discriminated to obtain an RF (Radio Frequency) signal;

converting said RF signal into binary digits as a pulse train signal;

counting the number of pulses in said pulse train signal for a predetermined time;

comparing a count value during said predetermined time with a threshold value;

determining said optical disc to be discriminated to be one of said at least two types of optical discs, having a least amount of recording density, when the count value within said predetermined time is equal to or less than said threshold value, displacing the radiation position of said read-out light beam to a position in a program region of said optical disc to be discriminated in the case where a count value within said predetermined time is equal to or less than said threshold value when the radiation position of said read-out light beam is at a position of the TOC region of said optical disc to be discriminated; and determining said optical disc to be discriminated to be a non-recorded optical disc by obtaining said RF signal by receiving reflected light from the position of the program region of said optical disc to be discriminated, when the count value within said predetermined time at the time of moving to the position of the program region is equal to or less than said threshold value.

4. An optical disc discrimination method for discriminating between at least two types of optical discs having record densities of recorded information, different from each other, comprising the steps of:

driving the optical disc to be discriminated to rotate;

performing at least a focus servo operation as a servo operation to irradiate a read-out light beam on said optical disc to be discriminated and receiving a reflected light beam from said optical disc to be discriminated to obtain an RF (Radio Frequency) signal;

converting said RF signal into binary digits as a pulse train signal;

counting the number of pulses in said pulse train signal for a predetermined time;

comparing a count value during said predetermined time with a threshold value;

determining said optical disc to be discriminated to be one of said at least two types of optical discs, having a least amount of recording density, when the count value within said predetermined time is equal to or less than said threshold value, wherein an irradiation position of said read-out light beam is at a position of a TOC (Table of Contents) region of said optical disc to be discriminated, and the optical disc discrimination method further comprising the steps of:

displacing the radiation position of said read-out light beam to a position in a program region of said optical disc to be discriminated in the case where a count value within said predetermined time is equal to or less than said threshold value when the radiation position of said read-out light beam is at a position of the TOC region of said optical disc to be discriminated; and determining said optical disc to be discriminated to be a non-recorded optical disc by obtaining said RF signal by receiving reflected light from the position of the program region of said optical disc to be discriminated, when the count value within said predetermined time at the time of moving to the position of the program region is equal to or less than said threshold value.

5. The optical disc discrimination method according to claim 1, wherein tracking servo operation is performed after determination of said optical disc to be discriminated has been completed.

6. An optical disc discrimination apparatus for discriminating between at least two types of optical discs having record densities of recorded information, different from each other, comprising:

a means for driving the optical disc to be discriminated to rotate;

a read-out means for performing at least a focus servo operation as a servo operation to irradiate a read-out light beam to said optical disc to be discriminated and for receiving reflected light from said optical disc to be discriminated to obtain an RF signal;

a converting means for converting said RF signal into binary digits as a pulse train signal;

a counting means for counting the number of pulses in said pulse train signal for a predetermined time when rotation of said optical disc is accelerating;

a comparing means for comparing a count value during said predetermined time with a threshold value; and a determining means for determining said optical disc to be discriminated to be one of said at least two types of optical discs, having the least amount of recording density, when the count value within said predetermined time is equal to or less than said threshold value.

7. The optical disc discrimination method of claim 1, wherein said threshold value is calculated based on a speed of rotation of the disc detected when the counting by the counting means is completed.

8. The optical disc discrimination apparatus of claim 6, wherein said threshold value is calculated based on a speed of rotation of the disc detected when the counting by the counting means is completed.

* * * * *